July 14, 1970 W. R. SCHLEHR 3,520,670
METHOD OF AND CHAMBER FOR THE MANUFACTURE OF FLOAT GLASS
Filed July 14, 1967 2 Sheets-Sheet 1

WALTER R. SCHLEHR
INVENTOR.

BY
John R. Faulkner
William E. Johnson
ATTORNEYS

July 14, 1970     W. R. SCHLEHR     3,520,670
METHOD OF AND CHAMBER FOR THE MANUFACTURE OF FLOAT GLASS
Filed July 14, 1967     2 Sheets-Sheet 2

WALTER R. SCHLEHR
INVENTOR.

BY John R. Faulkner
William E. Johnson
ATTORNEYS

United States Patent Office 3,520,670
Patented July 14, 1970

3,520,670
METHOD OF AND CHAMBER FOR THE MANUFACTURE OF FLOAT GLASS
Walter R. Schlehr, Dearborn, Mich., assignor to Ford Motor Company, Dearborn, Mich., a corporation of Delaware
Filed July 14, 1967, Ser. No. 653,386
Int. Cl. C03b *18/02*
U.S. Cl. 65—27                    8 Claims

ABSTRACT OF THE DISCLOSURE

A chamber utilized in the "float process" of manufacturing glass has a molten tin bath contained in the bottom portion thereof. The bottom of the chamber is defined by a plurality of refractory blocks which are mounted in spaced relationship to the bottom wall of the chamber. A layer of gas-permeable, carbonaceous material solid at the operational temperatures of the chamber and non-wettable by the molten tin is interposed between the refractory blocks and the bottom chamber wall. The porous, carbonaceous material keeps the area below the blocks free from molten tin so that a vacuum system, applied to that area, will be effective over the useful life of the chamber in reducing "thermal transpiration bubbling" in the chamber.

BACKGROUND OF THE INVENTION

This invention relates to the construction and operation of a chamber for utilization in the manufacture of flat glass by the so-called "float process." In the "float process," molten glass is poured on the surface of a molten bath contained in a chamber to obtain a glass ribbon having true parallelism of its opposite faces and a lustrous, fire-polished finish.

Generally, in the "float process" the molten bath is formed from metal having a density greater than that of glass. By known means, the molten glass is delivered at a uniform rate to the surface of the molten bath to form a ribbon of glass. The ribbon is then advanced along the surface of the bath under thermal conditions which permit the leading portion thereof to continuously harden to a degree sufficient to permit its removal from the bath without harm to the surfaces thereof.

The molten bath, which supports the glass, is contained within a substantially enclosed chamber having upper and lower refractory sections joined by suitable refractory side and end wall structures. The end wall structures have therein entrance and exit passageways through which, respectively, molten glass is fed to and the glass ribbon removed from the chamber. The lower refractory section forms the container for receiving and supporting the molten metal bath. The space within the chamber above the bath is filled with a protective atmosphere to prevent oxidation of the material making up the bath.

In constructing a float chamber, the lower refractory section is made from a plurality of refractory blocks of generally uniform size. When these refractory blocks are positioned in the chamber, the upward facing surface of all the blocks generally define a smooth and level bottom surface for the molten bath. Because of the random variation in the height of the individual refractory blocks, it is necessary to place shims between the blocks and the bottom outside wall of the chamber so that the upward facing surfaces of the plurality of blocks define the required smooth and level surface for the bath. By shimming the individual refractory blocks, an air space is left between the blocks and the bottom outside wall of the chamber.

In operation of the "float process," it has been found advantageous to draw a vacuum in the space underneath the refractory blocks defining the lower refractory section at least at the zone of the chamber wherein the molten glass initially flows out from the glass melting furnace onto the surface of the molten bath. The purpose of drawing a vacuum under the refractory blocks at this zone is to reduce the amount of "thermal transpiration bubbling" which occurs at this zone in the chamber. "Thermal transpiration bubbling" is a phenomenon wherein the atmosphere of the chamber is, in part, drawn down around the sides of the bottom refractory blocks, at the side wall edges of the chamber, and then up through the refractory blocks. The atmosphere may pass through the refractory ceramic blocks as they are porous and gas-permeable on a microscopic scale. The tiny bubbles of atmosphere gas pass up through the molten metal bath and into engagement with the underside of the glass ribbon floating on the bath. The engagement of the glass by the gas bubbles causes an indentation therein and results in subsequent scrapping of that portion of the glass having the indentation defect therein. By drawing a vacuum on the bottom of the refractory blocks, the atmosphere gas drawn into the air space under the refractory blocks is drawn out from the air space to the vacuum.

In prior art "float chamber" constructions, the effectiveness of the vacuum treatment to eliminate "thermal transpiration bubbling" has declined over the period of utilization or campaign life of the "float chamber." The decline of the effectiveness of the treatment is attributable to the fact that the metal utilized in the molten bath has a tendency to seep between individual ones of the refractory blocks defining the lower refractory section and subsequently flow into the air space below the respective blocks. Since the bottom outside wall of the chamber defines one surface of this air space, and since this outside wall is generally cool, the molten metal of the bath solidifies in the air space thereby reducing the volume upon which the vacuum acts. Over the campaign life of the chamber, almost the entire air space becomes filled with solidified bath metal whereby the vacuum treatment is rendered totally ineffective in dealing with the "thermal transpiration bubbling" problem.

When the vacuum system becomes ineffective, the prior art teaches that a hole may be bored through the solidified bath metal and into the porous refractory blocks whereby a vacuum treatment may be re-established through such holes on at least a portion of the refractory blocks. However, it has been found that this method of re-establishing the vacuum treatment is not as effective as applying the vacuum treatment to the entire air space below the refractory blocks.

SUMMARY OF THE INVENTION

This invention is directed to a method of and a chamber for utilization in the "float process" of manufacturing glass and, more particularly, the invention is directed to the method of operating and construction for such a chamber which results in a more effective application of vacuum to the air space located below the refractory ceramic blocks defining the chamber.

In order to construct a chamber for the manufacture of flat glass in accordance with the principles and teachings of this invention, a plurality of refractory ceramic blocks are supported in spaced relationship above a bottom wall of the chamber whereby an air space is defined therebetween. The top surfaces of the refractory blocks define a surface for the bottom of a cavity which receives and supports a molten tin bath therein. A gas-permeable, carbonaceous material is located in the air space between the refractory blocks and the bottom chamber wall.

By utilizing the gas-permeable, carbonaceous material between the refractory ceramic blocks and the bottom chamber wall, the vacuum ports through the bottom chamber wall permit a more effective vacuum to be drawn below the refractory blocks. The vacuum is more effective because the molten tin forming the bath does not wet and permeate the carbonaceous material and, therefore, the tin does not have a tendency to seep down and become trapped in the air space below the blocks. Also, in view of the fact that the refractory is porous and the atmosphere may be drawn therethrough, the vacuum treatment of the bottom of the refractory blocks is effective over substantially the entire air space below the blocks. By increasing the effective area of the application of vacuum and insuring that this area remains substantially free of solidified bath material, the "thermal transpiration bubbling" is substantially reduced over the campaign life of the "float chamber."

DESCRIPTION OF THE PREFERRED EMBODIMENT

Figure 1:
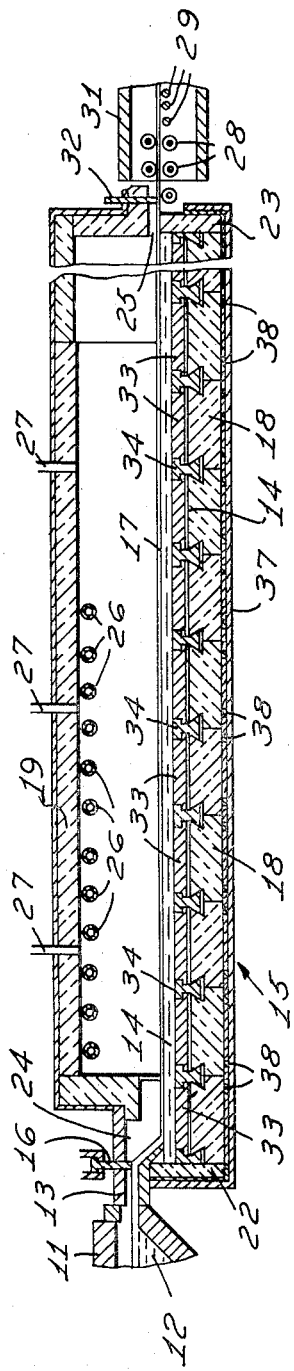
FIG. 1 is an elevational view, in cross section, showing the improved chamber of this invention for utilization in the manufacture of flat glass.

Referring now to the drawings, in FIG. 1 there is seen the delivery end of a conventional glass melting furnace 11 in which a constant level of glass 12 is maintained. The molten glass is delivered through a forehearth 13 onto the surface of a bath 14 of molten metal contained within a chamber 15. A tweel 16 controls the rate at which the glass 12 flows from the furnace 11. The molten metal bath 14 has a density greater than that of the glass 12 so that the glass will float on the surface thereof. By delivering the molten glass at a constant rate to the metal bath 14, a continuous ribbon of glass 17 of uniform width is produced. Preferably, the bath 14 is a pool of molten tin or an alloy of tin and in the remaining portion of this description, tin will be the material described as forming the molten bath.

The chamber 15 comprises a lower refractory section 18, an upper refractory section 19, refractory side blocks 21 and refractory end walls 22 and 23, all of which refractory walls or sections are both formed from a plurality of refractory blocks and joined together except for a restricted entrance 24 and exit 25 to provide the substantially enclosed chamber 15. The refractory side blocks 21 and the refractory end walls 22 and 23 project above the top surface of the lower refractory section 18 to define the container or cavity for the bath of molten tin 14.

To maintain the tin in a molten condition, and the glass ribbon 17 at the proper temperatures required to form a ribbon of good optical quality, heaters such as electrical heaters 26 (FIG. 1) are installed in the roof of the chamber 15. Coolers may also be provided in selected zones of the chamber 15 to assure that the glass ribbon 17 will be sufficiently cooled and hardened to be removed through the exit 25 without damage to the ribbon. The electrical heaters 26 are connected to a conventional power source (not shown) and may be individually controlled to provide the desired thermal gradient between the various zones of the chamber 15. Preferably, the molten glass 12 is introduced into the chamber 15 at a temperature of about 1850° F. and then, as the glass solidifies to form the ribbon 17, it is progressively cooled to a temperature of about 1100° F. at the exit 25.

An atmosphere gas is introduced into the chamber 15 through gas inlets 27 in order to provide a protective atmosphere within the chamber above the molten tin and glass floating thereupon. The atmosphere gas should be inert towards the tin making up the bath and towards carbonaceous material. Also, the atmosphere should not contain more than traces of oxygen, carbon dioxide or water vapor. As more fully described in U.S. Pat. 3,332,763 assigned to the same assignee as this application, a protective atmosphere consisting essentially of 4% carbon monoxide, 4% hydrogen and remainder nitrogen is the preferred atmosphere when the chamber has a carbonaceous liner.

The cooled glass ribbon 17 is withdrawn by driven traction rollers 28 onto a conveyor 29 to enter an annealing lehr 31 where the ribbon 17 is further cooled under controlled conditions to remove or reduce residual stresses therein. The exit 25 of the chamber 15 may be provided with a sealing member 32 both to retain the protective atmosphere gas in and to prevent the entrance of outside atmosphere into the chamber 15.

Figure 2:
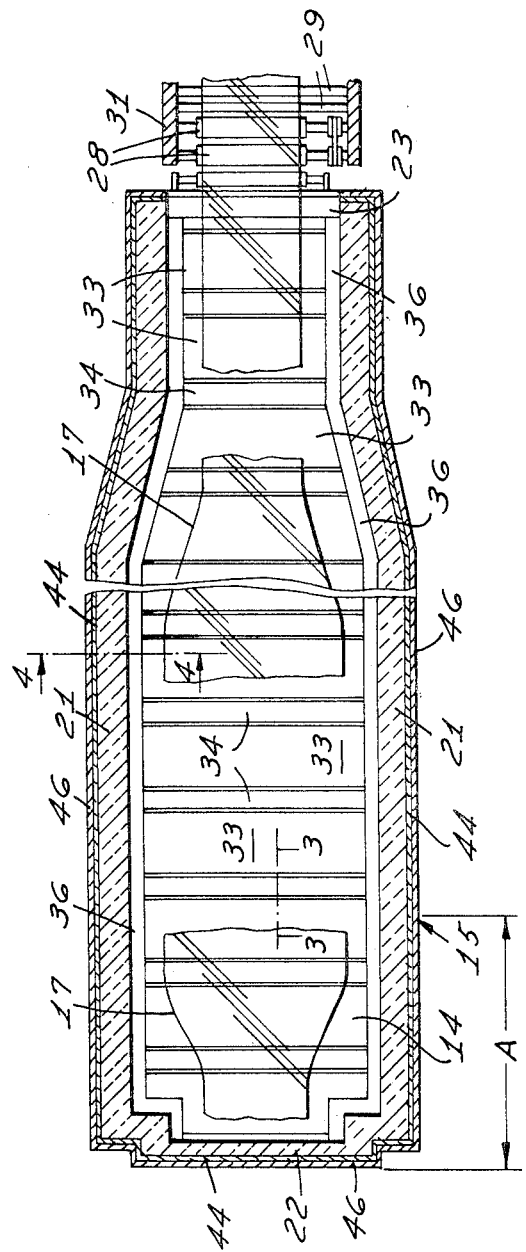
FIG. 2 is a plan view, in cross section, of the improved chamber of FIG. 1.

As described in U.S. Pat. 3,393,061 assigned to the same assignee as this application, a series of rectangular liner slabs 33, preferably of solid carbonaceous material, such as graphite, are provided in the chamber 15. As best seen in FIG. 2, the slabs 33 are installed so as to cover or line, preferably, the entire bottom area below the tin bath 14 in the chamber 15. While the teachings of this invention are applicable to "float chambers" not lined with a carbonaceous material such as graphite, the preferred embodiment of the chamber of this invention will be described as being lined with graphite.

In FIG. 2, the individual liner slabs 33 are shown as running the full width of the chamber 15. However, it should be appreciated that the slabs 33 are preferably coextensive with the individual refractory ceramic blocks defining the lower refractory section 18. More particularly, the number of liner slabs 33 utilized to line one width of the chamber 15 is preferably both equal in number to and identical in size with the number of refractory ceramic blocks necessary to define one transverse width of the lower refractory section 18. The individual liner slabs 33 are generally coextensive with the individual refractory blocks defining the lower refractory section such that upon the utilization of the chamber 15, if any upheaval in the lower refractory section occurs, the individual liner slabs 33 will readily adjust to the situation and there will be no buckling or cracking of the unitary piece of graphite.

With reference to FIGS. 1 and 2, each liner slab 33, or transverse series of liner slabs, is held in position by a transversely extending key or keys 34. The keys are generally shorter in length than the slabs and a greater number of keys extend across the width of the chamber. The manner of utilizing the keys and the slabs to line the chamber is described in detail in the above mentioned U.S. Pat. 3,393,061. The key 34 is made from the same material as the liner slab.

The slabs 33 and the keys 34, since they are made from graphite, which is substantially less dense than tin, are raised above the lower refractory section 18 by a buoyant force exerted thereon by molten tin. The graphite slabs and keys do not rise to the top surface of the tin and float thereupon because of the manner in which the keys 34 are supported by the lower refractory section 18. A depth of tin bath above the slabs 33 is maintained at a level of ½ to 4 inches in order to reduce the likelihood of the glass ribbon coming in contact with the slabs 33 if and when the glass ribbon buckles within the chamber 15.

Figure 4:
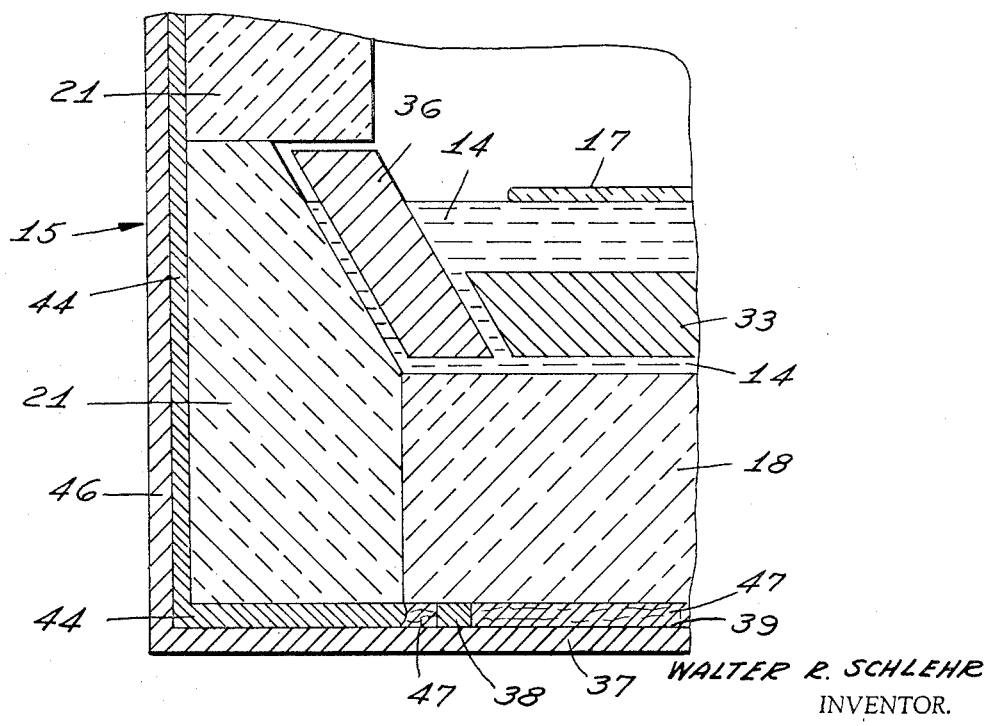
FIG. 4 is a partial, transverse view of the improved chamber taken along line 4—4 of FIG. 2.

As best seen in FIG. 4, the refractory side blocks 21 extend above the top surface of the lower refractory blocks 18. A side wall liner 36, comprising one continuous, or in the alternative, several slabs of a carbonaceous material such as graphite, is mounted by suitable members (not shown) adjacent the refractory side blocks 21 for the entire length of each side of the chamber 15. The side wall liner 36 is utilized to provide protection for the refractory side blocks 21 in the event that the glass ribbon 17 ruptures and a portion thereof moved towards the side wall of the chamber 15.

Figure 3:
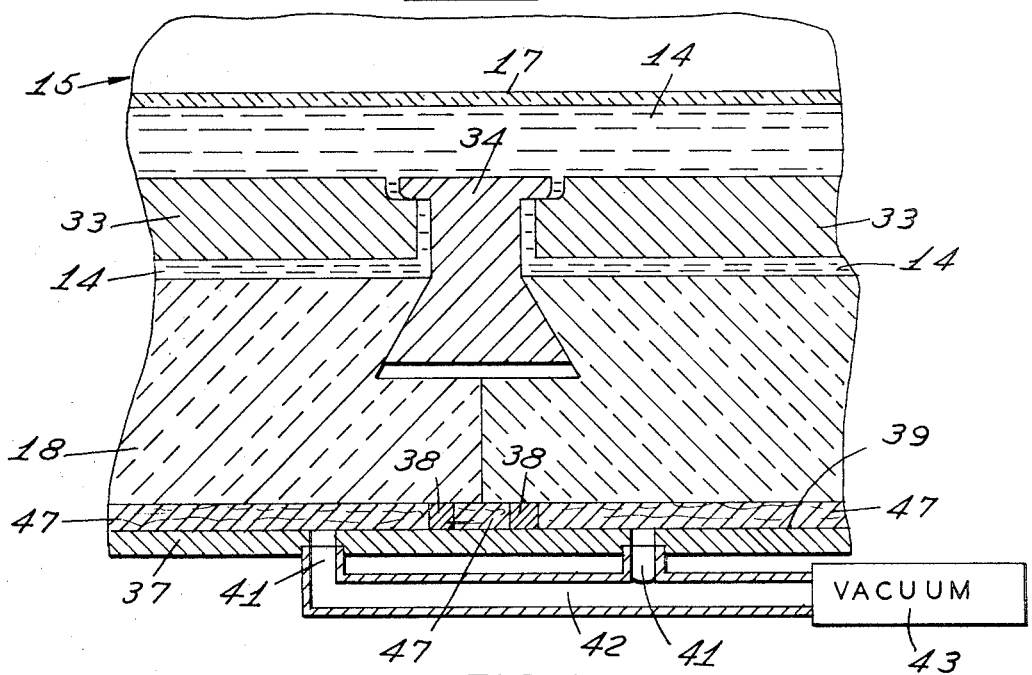
FIG. 3 is a partial, longitudinal sectional view of the improved chamber taken along line 3—3 of FIG. 2 showing, in detail, features of the chamber.

With reference to FIGS. 3 and 4, some of the details of the chamber 15 are shown, which details are omitted from the general views of FIG. 1 and 2. More particularly, the bottom refractory blocks 18, making up the lower refractory section, are supported above the bottom chamber wall 37 by means of shims 38 constructed of steel or refractory material. The purpose of shimming the lower refractory blocks 18 above the bottom wall 37 is to insure that the top surface of each refractory block 18 is parallel and level with the tops of adjacent blocks so that the blocks collectively define a smooth, level and continuous surface for the bottom of the bath 14. By shimming the blocks 18 above the bottom wall, a free space or air space 39 is provided therebelow. The air space 39 has a height varying from ⅛ inch to ½ inch because of the random variation in the heights of the refractory blocks 18.

With reference to FIG. 3, ports 41 are provided in the bottom chamber wall 37 and these ports are connected by an air line 42 to a vacuum source 43. Both the position at which, and the purpose of drawing a vacuum on the under portion of the refractory bottom blocks 18 will be described in detail below.

With reference to FIG. 4, a refractory ramming mix 44 is utilized to fill the space between the refractory side blocks 21 and the outside chamber side wall 46. This ramming mix extends down the side of the blocks 21 and therebelow to support the blocks. However, the ramming mix 44 terminates before the first lower refractory blocks 18. The purpose of the refractory ramming mix is to secure the side refractory blocks 21 in spaced, insulated relationship to the side and bottom walls 46 and 37, respectively, of the chamber 15. The refractory ramming mix 44 is porous in nature.

In accordance with the principles and teachings of this invention, a layer of porous, carbonaceous material 47, both gas-permeable and non-wettable by the material making up the molten bath 14, is disposed between the bottom chamber wall 37 and the refractory blocks 18 so as to entirely fill the free space or air space 39. Preferably, the material 47 is a gas-permeable, carbonaceous material such as graphite felt. Graphite felt may be purchased from National Carbon Company, Division of Union Carbide as Graphite Felt WDF.

Also, other forms of gas-permeable, carbonaceous material such as graphite and carbon cloth, carbon felt, graphite and carbon fibers, and foamed graphite are available from National Carbon Company and may be utilized as the porous, gas-permeable material in place of or in conjunction with the preferred graphite felt material.

With reference to FIG. 2, the leading portion of the chamber 15, indicated by the letter A in FIG. 2, is the flow-out zone of the chamber and, in this zone, the glass flows out from the forehearth 13 onto the molten metal bath 14. In this particular zone, the chamber 15 is maintained at its hottest temperature. In this regard, the predominant portion of the "thermal transpiration bubbling" occurs in this flow-out zone. It is in the zone of the chamber 15 that the vacuum system 43 is connected by ports 41 to the free space or air space 39 below the refractory blocks 18. A plurality of ports 41, within a few inches of one another, may be located throughout this zone.

The "thermal transpiration bubbling" occurs when either the protective atmosphere supplied through gas inlets 27 to the area above the molten bath or other gaseous materials seeping into the chamber pass through the refractory side blocks 21, down through the refractory ramming mix 44 and outwardly under the lower refractory blocks 18. By utilizing the gas-permeable, carbonaceous material 47, such as graphite felt, in the air space 39, the space is kept free from the molten tin making up the bath 14 as the graphite felt is not wetted by the tin and therefore the tin does not seep into the occupied area. Since the air space 39 does not become clogged by solidified tin, the vacuum source 43 is effective all the way across the air space below the flow-out zone of the chamber. As such, a substantial portion of both the protective atmosphere and other gaseous materials seeping down around the refractory blocks 21 and through the refractory ramming mix 44 is drawn out through the port 41 to the vacuum source.

Thus, by utilizing the layer of porous, carbonaceous material, which is gas-permeable and non-wettable by the tin making up the bath, the air space below the refractory bottom block is kept open. When a vacuum is applied to the air space, a substantial reduction is achieved over the campaign life of the chamber in the number of "thermal transpiration bubbling" defects in the glass ribbon being manufactured in the chamber.

In accordance with the principles and teachings of the preferred embodiment of this invention, it is only necessary to line the portion of the chamber below the flow-out zone with the gas-permeable, carbonaceous material in order to more effectively utilize any vacuum system applied to the chamber 15. However, for the purposes of reducing the heat losses from the entire chamber, it is of value to line the chamber for its entire length and width between the lower refractory section 18 and the bottom chamber wall 37 with a layer of the porous, carbonaceous material as this material is an excellent insulator.

Thus, there has been disclosed herein both a method of operating and a chamber for utilization in the "float process" of manufacturing glass. The chamber has a lining of porous, carbonaceous material which is gas-permeable and non-wettable by the material utilized in the bath of the chamber. This lining is disposed in a free space between the lower refractory section and the bottom chamber wall. The lining material increases the effectiveness of the vacuum system applied to the flow-out zone of the chamber and aids in reducing the "thermal transpiration bubbling" which occurs in such a chamber.

Many modifications of the basic concept of this invention will be obvious to one skilled in the art in view of the teachings of this invention. It is intended that all modifications, which fall within the true spirit and scope of this invention be included within the spirit and scope of the appended claims.

I claim:

1. The method of reducing the number of indentation defects caused by gas bubbling in a glass ribbon comprising supplying a molten tin bath to a cavity defined in a gas-permeable ceramic refractory material and contained in a substantially enclosed chamber; supplying an atmosphere gas therein substantially non-reactive with molten tin; flowing molten glass out upon said bath; providing a layer of gas-permeable, carbonaceous material both solid at the operational temperatures of said chamber and non-wettable by said molten tin below said refractory material defining said cavity; and drawing a vacuum on said gas-permeable, carbonaceous material so that substantially all of said atmosphere gas which seeps or becomes entrapped in the space below said refractory material will be drawn off from the said space to the vacuum source and will not seep through said gas-permeable refractory material and thereafter bubble up through the molten tin bath and into engagement with the underside of the glass ribbon floating on said bath to cause an indentation defect therein.

2. The method of reducing the number of indentation defects in a glass ribbon comprising supplying a molten tin bath to a cavity defined in a gas-permeable ceramic refractory material and contained in a substantially enclosed chamber having an entrance end and a flow out portion; supplying an atmosphere gas therein substantially non-reactive with molten tin; flowing molten glass out upon the molten tin bath at an entrance end of the bath; providing a layer of gas-permeable, carbonaceous material both solid at the operational temperatures of said chamber and non-wettable by said molten tin below at least said portion of said refractory material defining said flowout portion of said chamber; and drawing a vacuum on said gas-permeable, carbonaceous material so that substantially all of said atmosphere gas which seeps into or becomes entrapped in the space below said refractory material will be drawn off from the said space to the vacuum source and will not seep through said gas-permeable refractory material and thereafter bubble up through the molten tin bath and into engagement with the underside of the glass ribbon floating thereupon to cause an indentation defect therein.

3. A chamber utilized for the manufacture of flat glass which comprises: a bottom chamber wall; a plurality of refractory ceramic blocks; means for supporting said plurality of refractory ceramic blocks in spaced relationship above said bottom chamber wall so that the top surfaces of said refractory ceramic blocks define a surface for the bottom of a cavity; a molten tin bath received and supported in said cavity; an air space defined between the bottom surfaces of said plurality of refractory ceramic blocks and the top surface of said bottom chamber wall; and gas-permeable, insulating carbonaceous material both solid at the operational temperatures of said chamber and non-wettable by said molten tin located in said air space between said refractory ceramic blocks and said bottom chamber wall.

4. The improved chamber for the manufacture of flat glass as defined in claim 3 wherein said gas-permeable, carbonaceous material is graphite felt.

5. A chamber utilized for the manufacture of flat glass which comprises: a bottom chamber wall; a plurality of refractory ceramic blocks; means for supporting said plurality of refractory ceramic blocks in spaced relationship above said bottom chamber wall, the top surfaces of said plurality of refractory ceramic blocks defining a surface for the bottom of a cavity; a molten tin bath received and supported in said cavity; an air space defined between the bottom surfaces of said plurality of refractory ceramic blocks and said bottom chamber wall, said air space extending at least along a portion of the length of said cavity defined by said top surfaces of said plurality of refractory ceramic blocks; a vacuum system acting on at least a portion of said air space below said refractory ceramic blocks; and porous carbonaceous material located within said air space below said ceramic refractory blocks, said porous, carbonaceous material being solid at the operational temperatures of said chamber and gas-permeable and non-wettable by said molten tin making up said bath in said cavity so that the air space below said refractory blocks which is occupied by said material does not become clogged with tin during operation of said chamber and so that said air space below said refractory ceramic blocks remains an effective volume upon which said vacuum system may act.

6. The improved chamber for the manufacture of flat glass as defined in claim 5 wherein said gas-permeable, carbonaceous material is graphite felt.

7. A chamber utilized for the manufacture of flat glass which comprises: a bottom chamber wall; a plurality of gas permeable refractory ceramic blocks; means for mounting said plurality of refractory ceramic blocks in spaced relationship above said bottom chamber wall, the top surfaces of said plurality of refractory ceramic blocks defining a surface for the bottom of a cavity; a molten tin bath received and supported in said cavity; means enclosing said plurality of refractory ceramic blocks to define the chamber about said molten bath in said cavity; means for supplying a protective atmosphere to said chamber, said protective atmosphere being substantially inert towards molten tin and carbonaceous material; a graphite liner means for overlying at least a portion of said bottom surface of said cavity, said liner means being reactive with impurities in said chamber thereby to eliminate said impurities from said chamber without adversely affecting the quality of glass manufactured therein; an air space defined between the bottom surfaces of said plurality of refractory ceramic blocks and said bottom chamber wall, said air space extending at least along a portion of the length of said cavity defined in said top surfaces of said plurality of refractory ceramic blocks; a vacuum system acting upon said air space at least along a portion of the length of said cavity; and porous, carbonaceous material solid at the operational temperatures of said chamber located within said air space at least along a portion of the length of said cavity defined by said refractory blocks, said porous, carbonaceous material being non-wettable by said tin and being gas-permeable to said atmosphere supplied to said chamber above said bath so that molten tin will not seep into those areas below said refractory block which contain said porous, carbonaceous material whereby said areas remain effective vacuum paths for said vacuum system to remove any of said protective atmosphere which seeps into said air space so as to eliminate substantially all of the defects in said glass being manufactured in said chamber which would occur because of bubbling of said protective atmosphere through said refractory blocks and into engagement with said glass floating on said molten tin bath.

8. The improved chamber for the manufacture of flat glass as defined in claim 7 wherein said porous, gas-permeable, carbonaceous material is graphite felt.

References Cited

UNITED STATES PATENTS

| | | | |
|---|---|---|---|
| 3,140,164 | 7/1964 | Long | 65—99 |
| 3,334,983 | 8/1967 | Badger et al. | 65—99 |
| 3,393,061 | 7/1968 | Greenler et al. | 65—99 |
| 3,428,444 | 2/1969 | Swillinger | 65—99 |

S. LEON BASHORE, Primary Examiner

E. R. FREEDMAN, Assistant Examiner

U.S. Cl. X.R.

65—24, 65, 99, 182, 168, 169